United States Patent [19]

Byrne et al.

[11] 3,741,053

[45] June 26, 1973

[54] CODE NOTCHER FOR DATA CARRIER

[75] Inventors: Joseph E. Byrne; Gilbert F. Clifford, both of Los Altos; Donald F. Smith, Palo Alto; Arthur W. Odell, Atherton, all of Calif.

[73] Assignee: Varian Adco, Palo Alto, Calif.

[22] Filed: Nov. 15, 1971

[21] Appl. No.: 198,896

[52] U.S. Cl. .......................... 83/71, 83/522, 83/553, 83/558, 83/630, 83/917, 234/48

[51] Int. Cl. .......................... B26f 1/12

[58] Field of Search .......................... 83/71, 522, 553, 83/558, 630, 917; 234/47, 48

[56] References Cited

UNITED STATES PATENTS

| | | | |
|---|---|---|---|
| 2,704,578 | 3/1955 | Feiertag | 234/47 X |
| 3,263,538 | 8/1966 | Gobel et al. | 83/917 X |
| 3,534,904 | 10/1970 | Kalthoff et al. | 234/48 |

*Primary Examiner*—J. M. Meister
*Attorney*—Aldo J. Test, Paul D. Flehr et al.

[57] ABSTRACT

A code notcher for microfiche carriers which includes a mechanical toggle apparatus for punching the notches in the carrier and a clamp and backstop for positioning the carrier in a position to be notched.

11 Claims, 11 Drawing Figures

JOSEPH E. BYRNE
INVENTOR

BY Flehr, Hohbach, Test, Albritton and Herbert
ATTORNEYS

JOSEPH E. BYRNE
INVENTOR

BY Flehr, Hohbach, Test, Albritton and Herbert
ATTORNEYS

JOSEPH E. BYRNE
INVENTOR.

BY Flehr, Hohbach, Test, Albritton and Herbert
ATTORNEYS

JOSEPH E. BYRNE
INVENTOR

BY Flehr, Hohbach, Test, Albritton and Herbert

ATTORNEYS

CODE NOTCHER FOR DATA CARRIER

BACKGROUND OF THE INVENTION

The present invention is directed to a code notcher for data carriers and more specifically to apparatus for notching microfiche carriers.

In notching microfiche carriers with a code so that they may be retrieved from a storage bin, it is necessary that the notching be done accurately and rapidly. The apparatus should also be fool-proof in operation since nontechnical operators will normally code in the retrieval data.

OBJECTS AND SUMMARY OF THE INVENTION

It is, therefore, a general object of the invention to provide an improved code notcher for film carriers.

It is another object to provide a notcher which notches rapidly and accurately.

It is another object of the invention to provide a notcher which is foolproof in operation.

In accordance with the above objects there is provided apparatus for punching code notches in the edge of a film carrier. The code has a plurality of predetermined notch positions. Punch means are mounted in juxtaposition with the edge of the carrier. Means are provided for sequentially indexing the punch means to each of the notch positions. Memory means store coded data and toggle means are responsive to the memory means for actuating the punch means to notch the carrier.

DETAILED DESCRIPTION OF THE PREFERRED EMBODIMENT

Figures 1, 2:
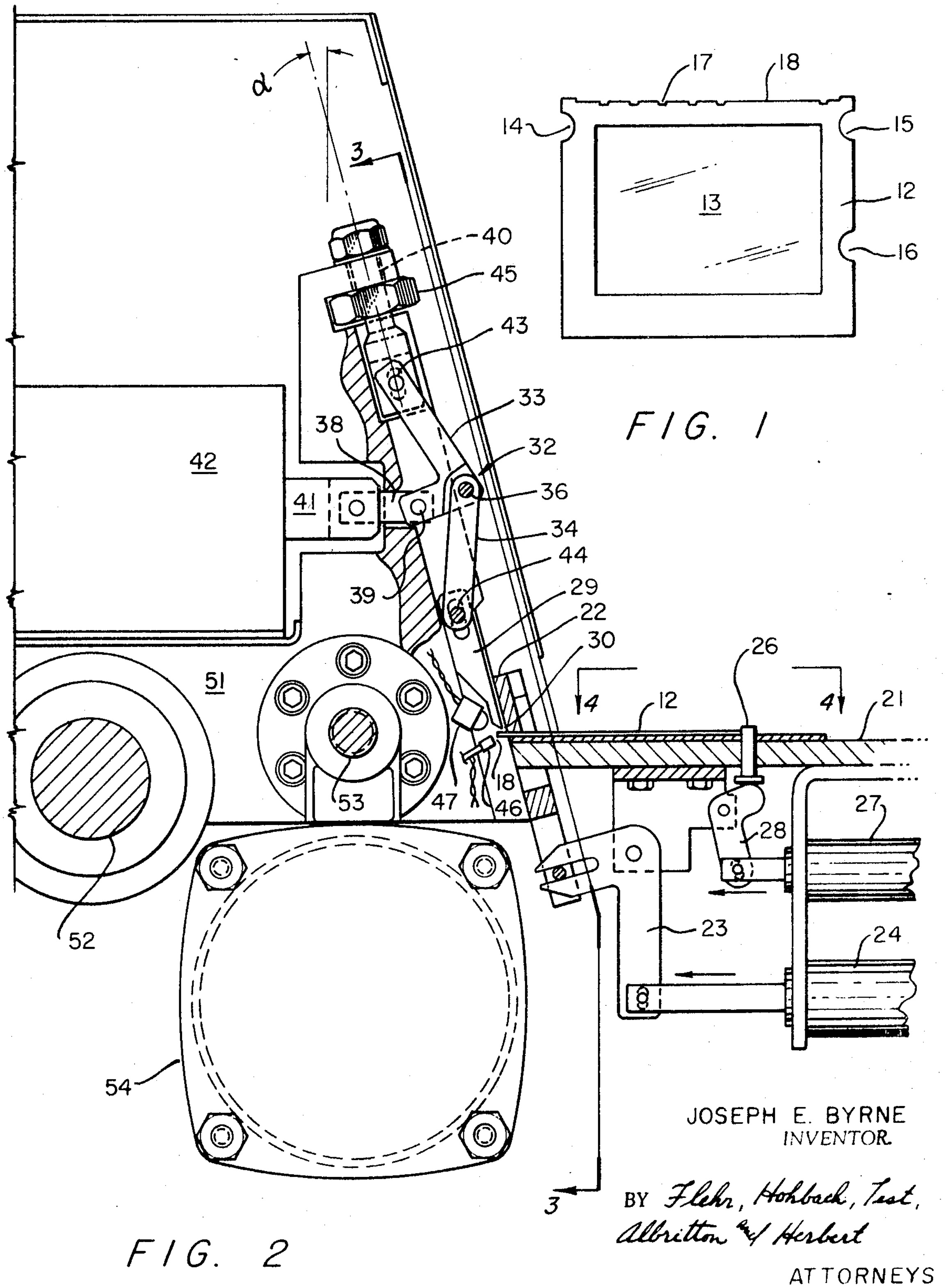
FIG. 1 is a plan view of a microfiche carrier showing its notches.
FIG. 2 is a cross-sectional view of a notcher embodying the present invention.

FIG. 1 illustrates a typical microfiche carrier 12 which normally has affixed to it a microfilm sheet 13 termed a microfiche. Carrier 12 has handling notches 14 and 15 in its sides along with a side orientation notch 16. This notch is for the purpose of insuring that the microfiche is always read in the proper side orientation. In addition, it provides for reading of the code notches 17 on the edge 18 of carrier 12. These edge notches each carry a particular identifying code for locating that particular carrier. Notches 17 are located in sixty-four different notch positions across edge 18.

A microfiche locating system for locating coded microfiche of the present type is disclosed and claimed in a copending application entitled "Document And Information Storage and Retrieval System", Ser. No. 7,884, filed Feb. 2, 1970, and assigned to the present assignee. Such a system includes a multi-level storage cabinet where each level has a plurality of side-by-side elongated bins which hold edge-notched film or microfiche carriers. Each level includes scanning, retrieval, transportation, display and refiling systems for selectively filing and retrieving the carrier carrying documentary or other information.

A cross section of the apparatus for punching the code notches is shown in FIG. 2 with the carrier 12 as shown lying on the table 21 of the notcher. Carrier 12 was retained on its edge 18 by a clamp 22 which is actuated through lever 23 by a solenoid 24. On the opposite edge it is retained by a backstop 26 which is slidably mounted in table 21. Backstop 26 is actuated to its extended position from table 21, as illustrated, by a backstop solenoid 27 which is coupled to the backstop by a lever 28. Punch means 29 are mounted in juxtaposition with the edge 18 of the carrier 12. The punch means include a knife edge 30 for notching edge 18.

Toggle means actuate the punch 29 to notch carrier edge 18. The toggle includes a first link 33 and a second link 34 which are pivoted together at 36 and pivotally mounted to a pull link 38 at pivot point 39. The pull link 39 in turn is coupled to a plunger 41 which is part of solenoid 42. The other ends of links 33 and 34 are respectively coupled to a fixed pivot point 43 and to punch 29 to pivot point 44. The axis of movement of punch 29 is at an angle $\alpha$ as illustrated with respect to a perpendicular to the table 21 and carrier 12.

Pivot point 43 is coupled to a locking screw 40 which is axially positioned by an adjustment nut 45. By adjustment of the pivot point the travel of knife edge 30 is limited to just breaking through the bottom side of edge 18. At this time links 33 and 34 are straight.

In order to verify the notches punched in edge 18, a light source 46 is provided for illuminating the notches or the lack of a notch along with a photodetector 47. In accordance with the above copending application, notches may be read in this manner.

Figure 3:
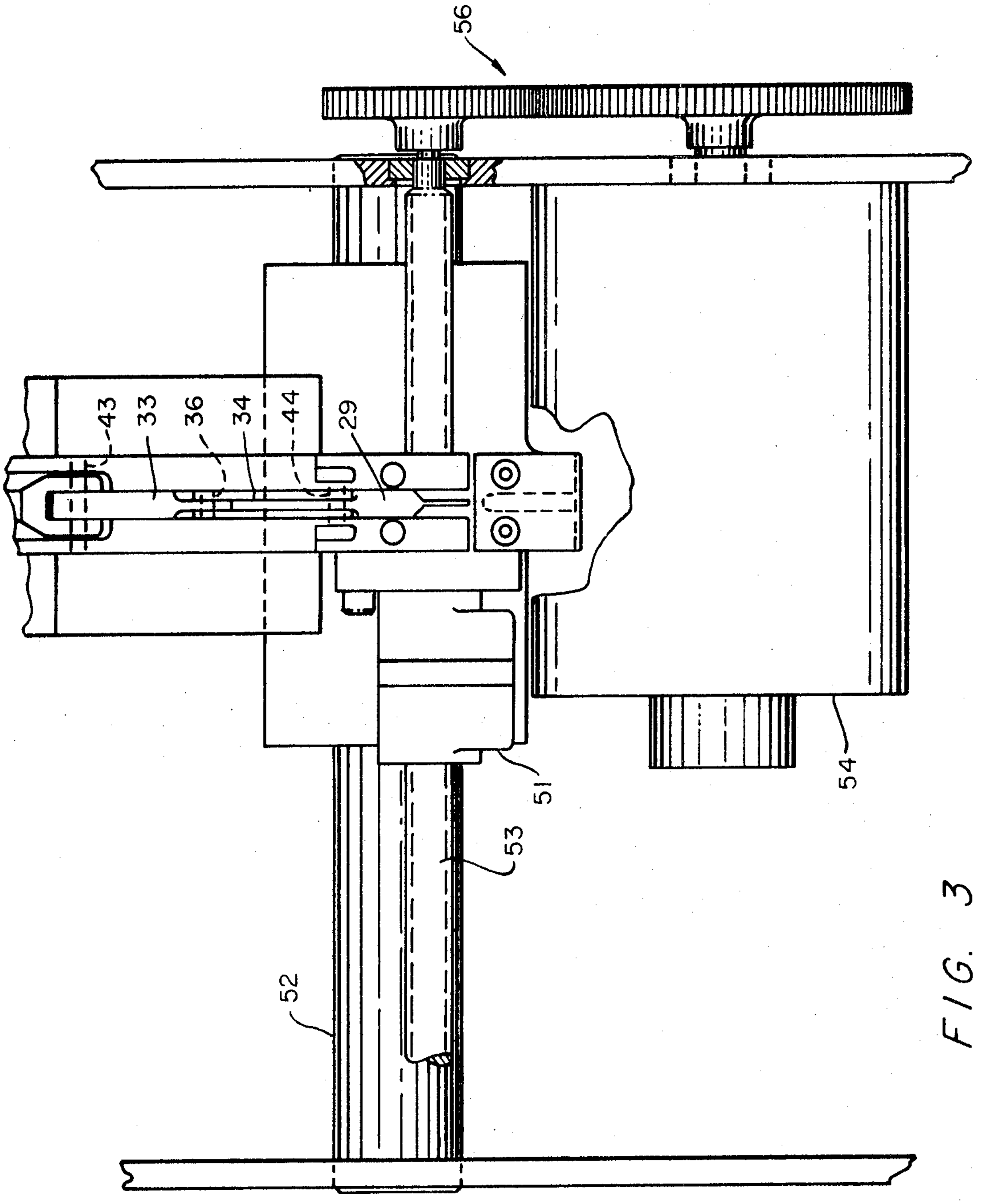
FIG. 3 is a cross-sectional view taken along the line 3—3 of FIG. 2.

The punch 29, toggle structure 32 and electrosolenoid 42 are all mounted on a carriage 51 as best shown in FIG. 3. Carriage 51 is mounted on a support shaft 52 and it is indexed to the various punch or code notch positions by use of a ball screw 53 which is driven by stepper motor 54 through gearring 56.

Figure 4:
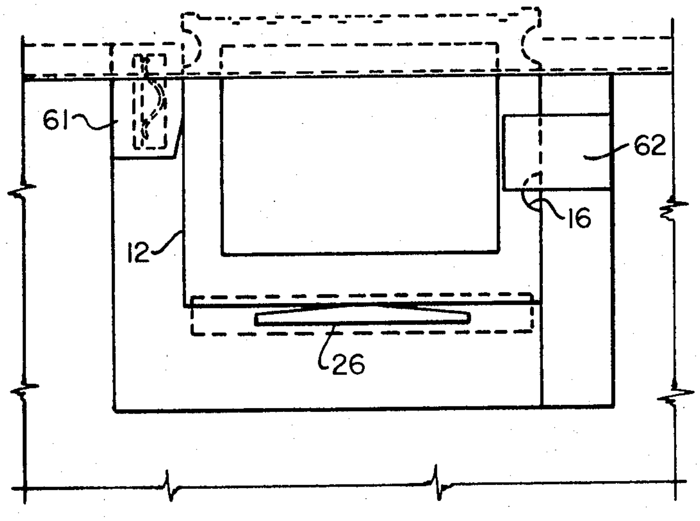
FIG. 4 is a plan view taken along line 4—4 of FIG. 2.

FIG. 4 shows carrier 12 as it would be inserted in a slot formed by a spring loaded left lateral guide member 61 and a fixed right later guide member 62 which has within it a photosensing device for sensing the side orientation of notch 16. The rear edge of carrier 12 is engaged by backstop 26. Fixed member 62 engages the same edge of carrier 12 which includes notch 16. This edge is also a reference edge for use in affixing the data carrying file or microfiche to the carrier.

Figure 7:
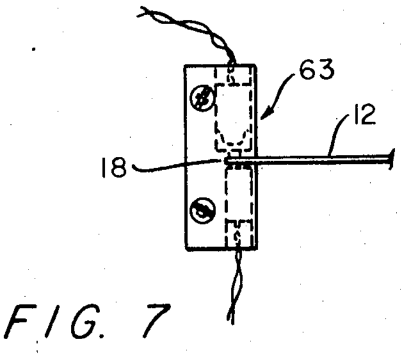
FIG. 7 is a cross-sectional view taken along line 7—7 of FIG. 5.
Figure 8:
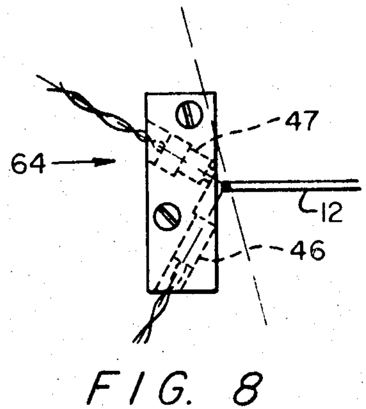
FIG. 8 is a cross-sectional view taken along line 8—8 of FIG. 5.
Figure 5:
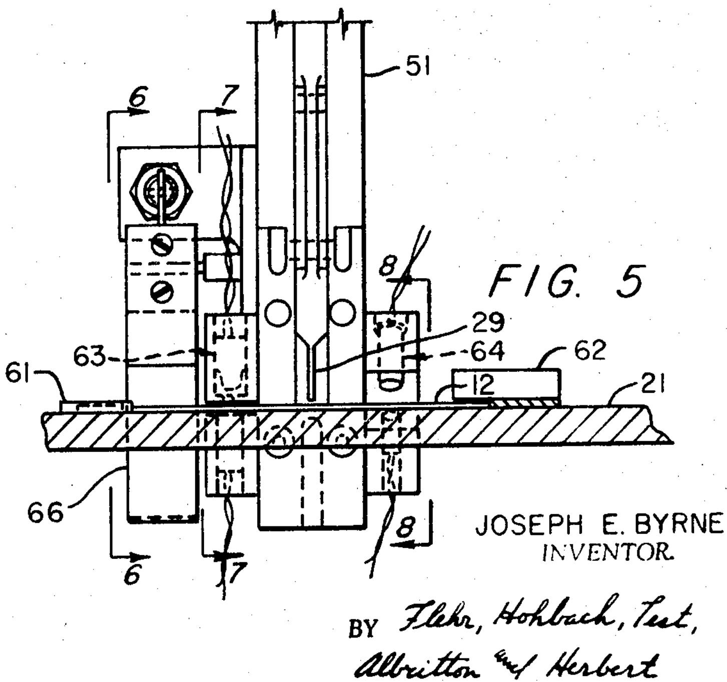
FIG. 5 is a cross-sectional view of a portion of FIG. 1.

The cross-sectional view of FIG. 5 shows punch 29 as it would be mounted on the carriage 51 along with associated photo sensors 63 and 64. Sensor 63 is shown in FIG. 7 and it is for the purpose of sensing the edge 18 of carrier 12. It includes both a light source and photodetector means. Photo sensor 64 is best shown in FIG. 8 and is for the purpose of verifying the notch and includes as was shown in FIG. 1 the light source 46 along with the photodector 47.

Figure 6:
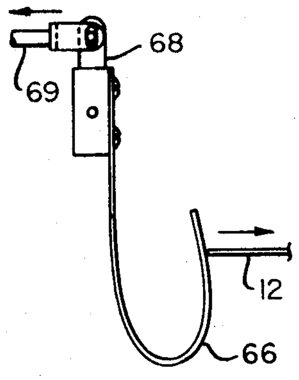
FIG. 6 is a cross-sectional view taken along line 6—6 of FIG. 5.

Means for pushing the carrier against the backstop 26 (FIG. 4) includes as shown in both FIGS. 5 and 6 a U-shaped spring 66 which engages the carrier 12 for movement in the direction shown by the arrow. The spring is pivoted at a pivot point or is actuated around the pivot point by a lever 68 coupled to a solenoid 69.

Figure 9:
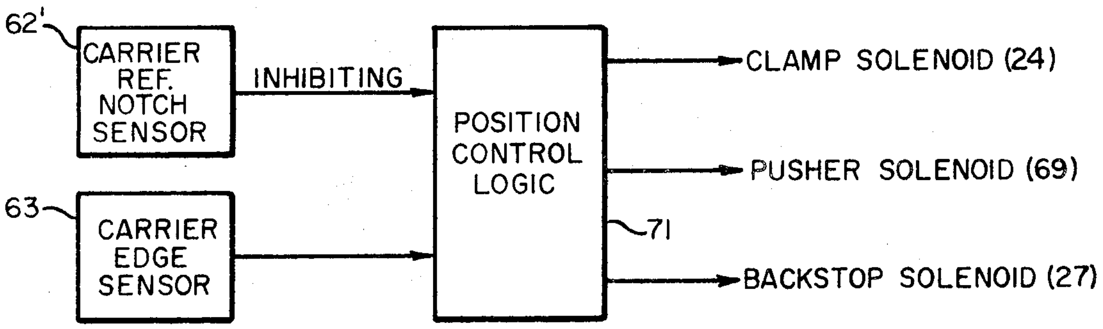
FIG. 9 is a block diagram showing the position control for the carrier.

FIG. 9 illustrates the position control for positioning carrier 12 in a position for notching. It includes a position control logic unit 71 which has as its inputs a chip reference detector 62' which is included in guide 62 for detecting the side orientation of notch 16. This inhibits the operation of the entire system when the carrier is in an erroneous side orientation. The other input to position control logic 71 is the carrier edge sensor 63. Position control logic 71 operates both the clamp solenoid 24, pusher solenoid 69 and backstop solenoid 27.

Figure 10:
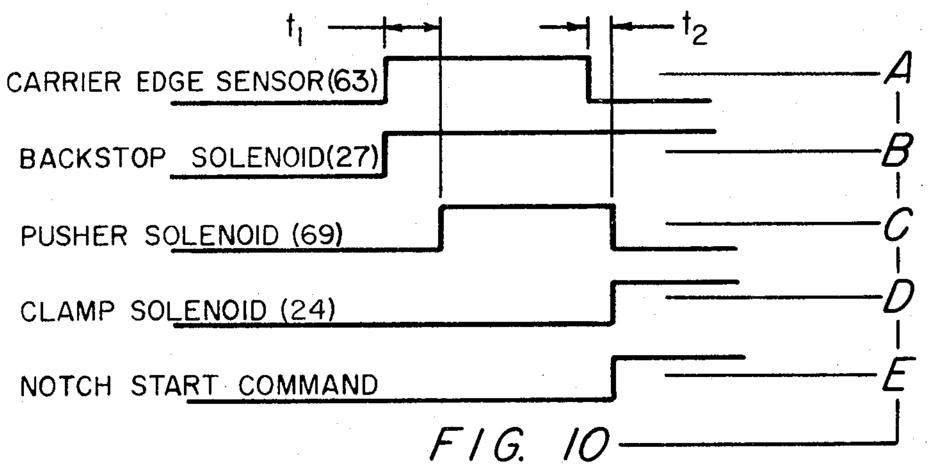
FIGS. 10A through 10E are timing diagrams useful in understanding the operation of the invention of FIG. 9.

The time sequence of the foregoing is illustrated in FIGS. 10A through 10E. When the operator places the carrier 12 on table 21 the edge detector 62' as illustrated in FIG. 10A is activated when it is pushed far enough inwardly. This is designated as time $t_1$. Immediately, the backstop solenoid 27 is activated as shown in FIG. 10B to prevent withdrawl of the carrier. A short time delay later, the pusher solenoid 69 pushes the carrier 12 against the backstop. When the pushing action ceases the clamp solenoid 24 is activated as shown in FIG. 10D. This signals the notching control logic circuit with a "notch start command" (FIG. 10E) that the notching is ready to begin.

Figure 11:
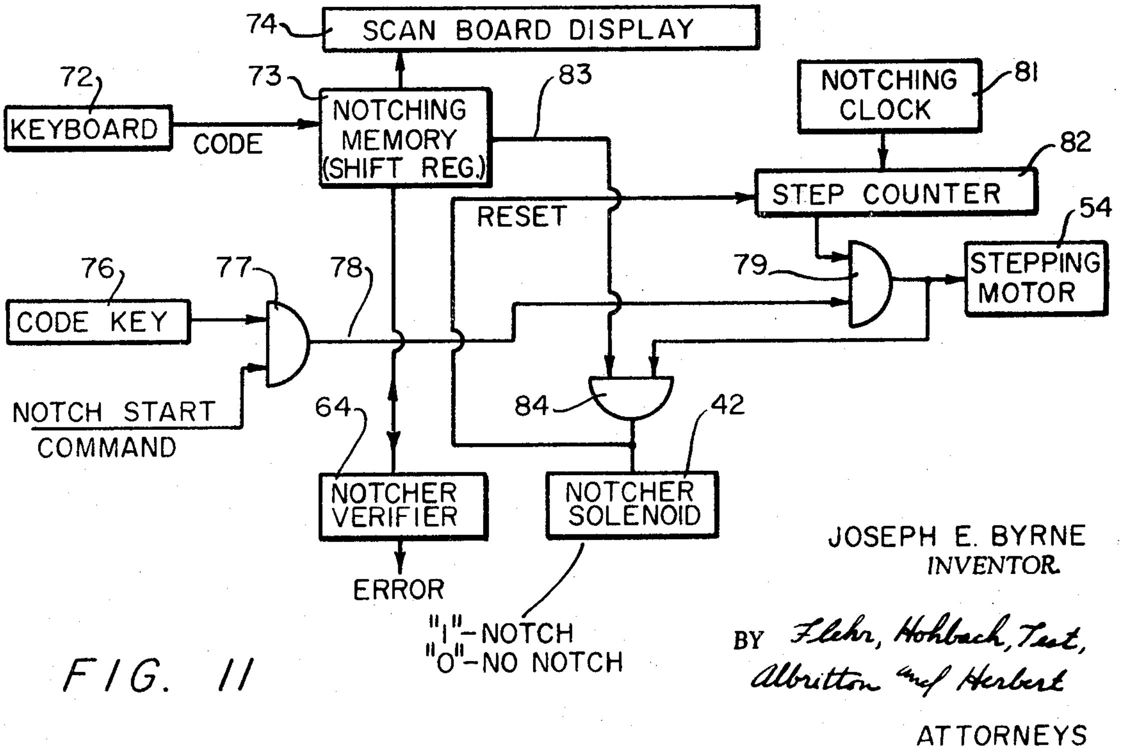
FIG. 11 is a block diagram showing the notching control of the present invention.

FIG. 11 illustrates the notching control circuit. The operator by pressing keys on the keyboard 72 provides a notching code to a notching memory 73 which is in actuality a shift register. In order to check the correctness of the code it is displayed on a scan board display 74. Assuming the correct information has been entered in the memory 73 a code key 76 is then depressed to provide a code key command to AND gate 77. The other coincidence input of the AND gate is the "notch start command" from the position control logic of FIG. 9. An output on line 78 from AND gate 77 is coupled to one of the inputs of an AND gate 79 which in turn activates stepper motor 54. In practice, the stepper motor in order to provide for greater accuracy is activated in increments of 68 steps for each notch. Thus, a notching clock 81 provides a proper frequency for the stepper motor and a step counter 82 is preset for the 68 counts so that upon completion of each notching or lack of a notch which would be a binary zero, the stepper motor moves 68 increments which is equal to one notch position. The activation of stepper motor 54 and AND gate 79 also causes a bit of data to be transferred on line 83 from memory 73 through the AND gate 84. This actuates notching solenoid 42 which provides a binary 1 for a notch and a binary 0 when it takes no action. The completion of a notch or a nonaction resets the stop counter 82 for the next sequence of action.

The carriage 51 scans through the various notch positions to the last notch on edge 18 of the carrier. It is then returned. During the return the notcher verifier 64, illustrated in FIG. 8, scans the notches individually to match the recorded data with that stored in memory 73 and any noncomparison results in an error signal.

Referring now specifically to FIG. 2, the toggling action of the particular toggle arrangement 32 provides for accurate and effective notching. This is because the toggle arrangement translates a small amount of force provided by plunger 41 and notcher solenoid 42 to a relatively large amount of force to notch edge 18. During initial movement of the toggle when the force provided by solenoid 42 is the least, there is no contact with edge 18 by the punch knife 29. However, as the travel of the plunger 49 increases, thereby allowing the solenoid electromagnet to provide greater force, the knife edge 30 of punch 29 engages edge 18 to start the notching action. At this time, the links 33 and 34 are approaching a straight orientation with respect to each other. The force multiplication is greatest at this time. Thus, the toggling arrangement shown in the present invention is ideally suited for use in notching the edges of microfiche carriers.

Moreover, by the effective toggling action as described above notching may be accomplished rapidly and accurately during the sequential indexing of the punch along the edge of the carrier. This is much desired rather than having a number of punches equal to the number of code notches.

The mounting of the verification sensor 64, which includes light source 46 and photodetector 47, on the moving carriage 51 also allows verification to be accomplished on the return travel of the notching apparatus.

Thus, the present invention provides an improved code notcher for film carriers which provides notches rapidly and accurately by means of verification and positioning apparatus is substantially foolproof in operation.

We claim:

1. Apparatus for punching code notches in the edge of a data carrier said code having a plurality of predetermined notch positions comprising: punch means mounted in juxtaposition with said edge of said carrier; means for sequentially indexing said punch means to each of said notch positions; memory means for storing coded data; toggle means responsive to said memory means for actuating said punch means to notch said carrier.

2. Apparatus as in claim 1 where said toggle means includes first and second toggle links coupled together at one end and to a pull link, the other end of said first link being mounted on a fixed pivot and the other end of said second link being pivoted to said punch means said punch means being slidably mounted, together with solenoid means for moving said pull link whereby said toggle links are straightened and said punch means slide into engagement with said carrier edge.

3. Apparatus as in claim 1 together with means for positioning said carrier including means for detecting the presence of said edge of said carrier, means responsive to said detection of said edge for backstopping the edge of said carrier opposite said detected edge, means for pushing said carrier against said backstopping means, means responsive to said pushing means for clamping said carrier against movement, and means responsive to actuation of said clamping means for actuating said toggle means for notching said carrier edge in accordance with said stored coded data.

4. Apparatus as in claim 3 where said edge detecting means is mounted for indexed movement with said punch means.

5. Apparatus as in claim 3 together with means for detecting the side orientation of said film carrier and for inhibiting operation of said toggle means if said side orientation is erroneous.

6. Apparatus as in claim 1 where said punch means is mounted at a predetermined angle with respect to a perpendicular to said carrier.

7. Apparatus as in claim 1 together with verification means for verifying said punched notches mounted for indexed movement with said punch means.

8. Apparatus as in claim 7 where said verification means includes a light source and photo-sensor for sensing individual notches.

9. Apparatus as in claim 1 where said toggle means includes means for adjusting the travel of said punch means to breaking through said edge but traveling no further.

10. Apparatus as in claim 9 where said adjusting means includes an adjustment not coupled to a link of said toggle means along with a lock screw for locking said nut.

11. Apparatus as in claim 1 together with means for positioning said carrier including a fixed lateral guide and a spring loaded lateral guide said carrier having a reference edge which engages said fixed guide.

* * * * *